April 25, 1967
F. E. WILEY ET AL 3,315,308
CONTINUOUS PRODUCTION OF BIAXIALLY ORIENTED,
CRYSTALLINE, THERMOPLASTIC FILM
Original Filed Feb. 15, 1962 2 Sheets-Sheet 1
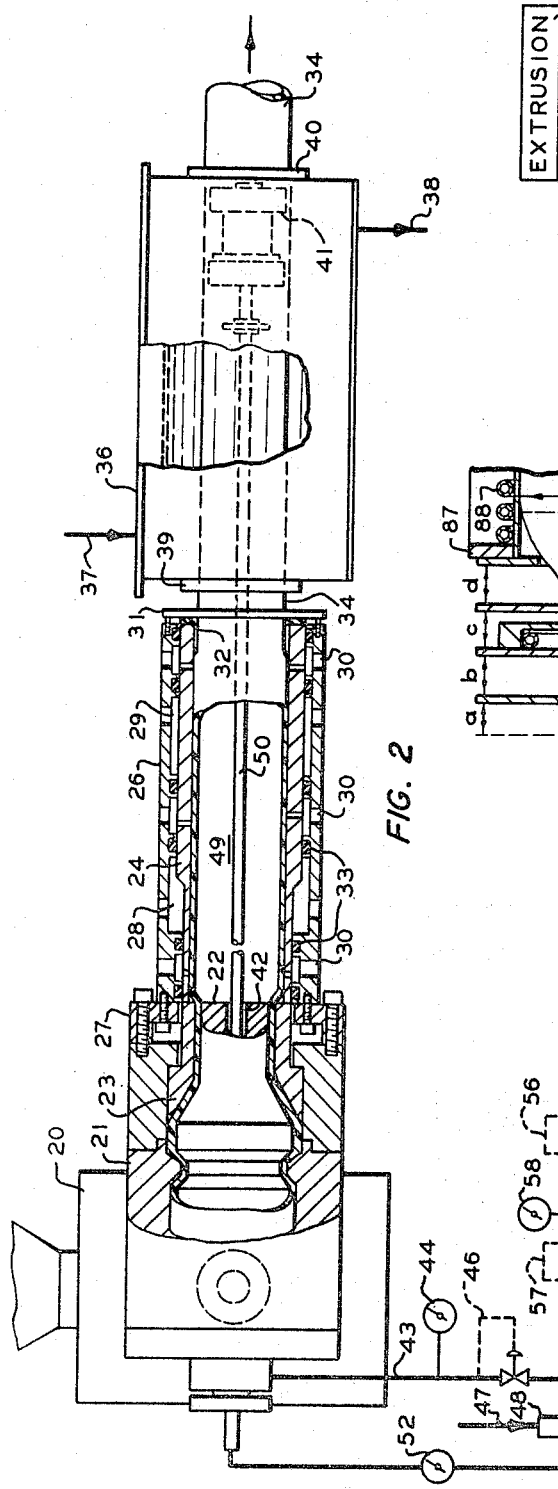
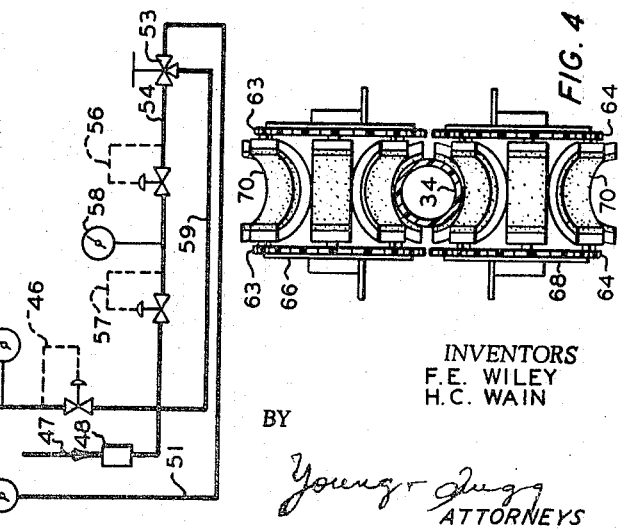
INVENTORS
F.E. WILEY
H.C. WAIN
BY
ATTORNEYS April 25, 1967 F. E. WILEY ET AL 3,315,308
CONTINUOUS PRODUCTION OF BIAXIALLY ORIENTED,
CRYSTALLINE, THERMOPLASTIC FILM
Original Filed Feb. 15, 1962 2 Sheets-Sheet 2
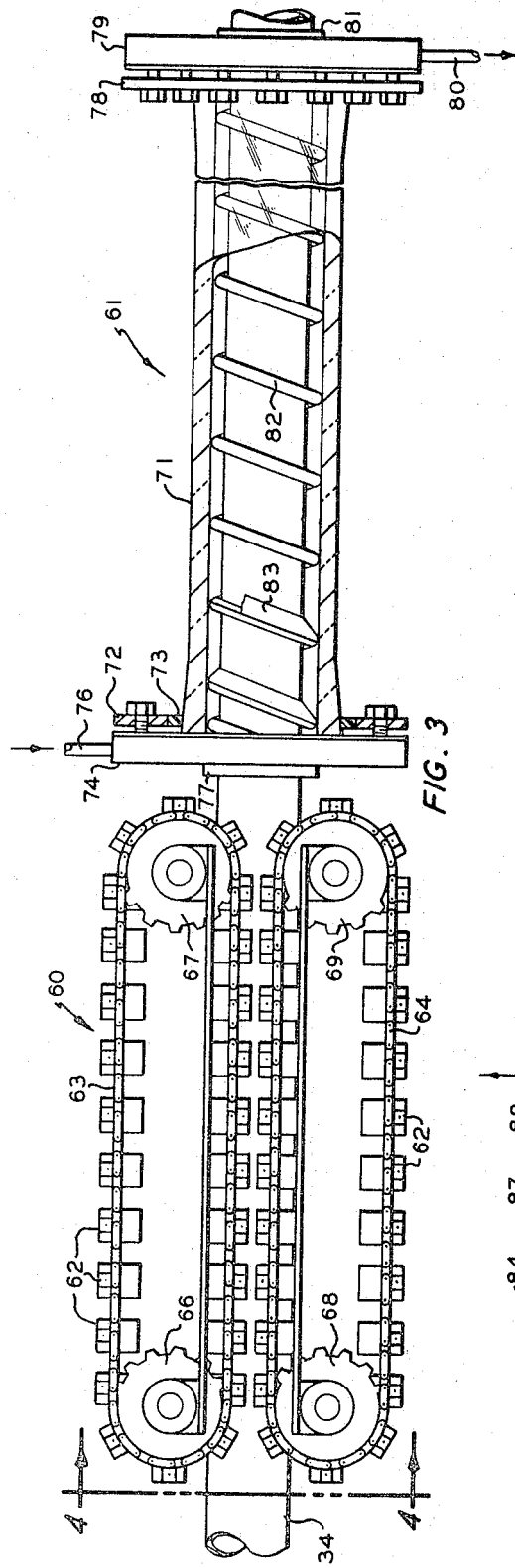
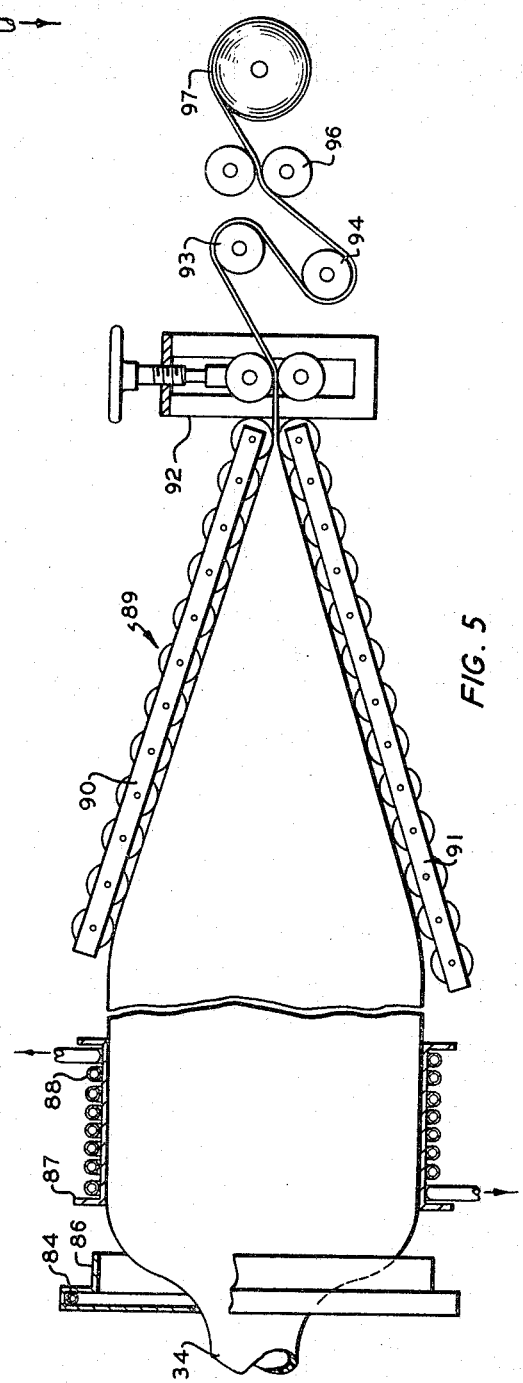
INVENTORS
F.E. WILEY
H.C. WAIN
BY
ATTORNEYS

United States Patent Office 3,315,308
Patented Apr. 25, 1967

3,315,308
CONTINUOUS PRODUCTION OF BIAXIALLY ORIENTED, CRYSTALLINE, THERMOPLASTIC FILM
Fred E. Wiley, Longmeadow, Mass., and Harry C. Wain, Somers, Conn., assignors to Phillips Petroleum Company, a corporation of Delaware
Original application Feb. 15, 1962, Ser. No. 173,557, now Patent No. 3,248,463, dated Apr. 26, 1966. Divided and this application Feb. 17, 1966, Ser. No. 528,236
8 Claims. (Cl. 18—14)

This application is a divisional of Ser. No. 173,557, filed Feb. 15, 1962, now Patent No. 3,248,463.

This invention relates to a process for making biaxially oriented film from crystalline thermoplastic polymer. In another aspect it relates to apparatus which can be used for the continuous production of tough, thermoplastic films having balanced properties in desired proportions.

It is well known that molecular orientation of various crystallizable thermoplastic polymers in the form of sheets, films, filaments, tapes, tubes, pipe, or the like, increases the tensile strength of these structures. This orientation is commonly brought about by stretching the polymeric structure after formation thereof, and this stretching should be carried out at temperatures sufficiently low that the polymer is in a substantially crystalline condition. In other words, if the temperature of the polymer is sufficiently high that substantially all of the crystallites have melted, very little orientation occurs when the structure is stretched. Numerous methods have developed for the continuous production of oriented polymeric structures by extruding the polymer in the shape desired, subsequently cooling it to a temperature below the temperature required for the formation of crystals, and thereafter stretching the structure by placing it under tension. Biaxial orientation can be brought about by stretching the sheet or film first in one direction and then in a second direction at approximately right angles to the direction of the initial stretch. This sequential stretching is not desirable for many materials, particularly the crystalline olefin polymers such as polyethylene, polypropylene, and the like, since the beneficial results obtained in the initial stretch are considerably diminished by the second step of the orientation. Simultaneous biaxial stretching is desirable for the production of biaxially oriented films of these polymers.

While most of the effort in this field has been directed to increasing the tensile strengths of polymeric films in one or both directions, we have found that the biaxially oriented films presently available from these procedures are not necessarily satisfactory for heavy packaging needs, for example, as bag materials for bulk chemical and food products. Because of the very high protection offered by films of olefin polymers, these being substantially impervious to moisture and highly resistant to chemicals, bags formed from these films are well suited for the storage and shipping of chemicals such as fertilizers, for example, ammonium nitrate or ammonium sulfate. These materials are commonly packaged in bags of 40, 80, or 100 pounds and are inevitably subjected to rough handling before the product is used by the consumer. Such bags are most likely to fail when subjected to shock or heavy impact which produces stresses that cannot be rapidly dissipated, thereby causing the bag wall to rupture.

We have now discovered a method for continuously producing a biaxially oriented film of crystalline thermoplastic polymer in such a manner that the film has a balance of properties making it highly suitable for use as bag material in the heavy packaging field. According to this method the polymer melt is extruded in the shape of a tube which is then cooled and reheated to a temperature within a few degrees below the crystalline melting point of the polymer, thereby placing it at the orientation temperature. The tube is then stretched biaxially by simultaneous radial expansion and linear extension and then cooled to set the orientation. A feature of our invention comprises directing a current of cooling gas onto the outer surface of the tube as it is being stretched biaxially. The use of this cooling gas establishes a minimum temperature gradient over the expanding bubble and the film thus produced has a balance of tensile and elongation properties in both the machine and the transverse directions which makes it tough and highly resistant to rupture on impact. This balance of properties which is highly desirable in heavy bag material is not obtained under otherwise identical conditions but in the absence of the current of cooling gas on the outer surface of the expanding tube.

As another aspect of our invention we have provided apparatus for producing biaxially oriented film of crystalline thermoplastic polymer comprising, in combination, extrusion means including a tubing die, a sizing and cooling sleeve attached to said die, a cooling bath positioned to receive the extruded tube from the sizing sleeve, means for pulling the tube through the sizing and cooling bath, a heating bath positioned downstream from the pulling means, this heating bath being equipped with means for circulating a heated fluid in direct heat exchange with the tube in order to bring the tube to orientation temperature, means for introducing a pressurized gas inside the tube in order to inflate it as it issues from the heating bath, means for collapsing and pulling the inflated tube in order to stretch the tube lengthwise as it issues from the heating bath, means for chilling the inflated and stretched tube in order to set the orientation prior to collapsing the tube, and means for directing a current of cooling gas onto the outer surfaces of the tube as it is being inflated and stretched.

It is an object of our invention to provide a method for continuously producing a biaxially oriented film of thermoplastic crystalline polymer. It is another object of our invention to provide a method of producing a film of themoplastic polymer in such a manner that the film has a balance of physical properties making it particularly suitable for use as a bag material. Still another object of our invention is to provide a tough thermoplastic film which is highly resistant to rupture on impact. Another object of our invention is to provide apparatus which can be used to produce such a film. Other objects, advantages and features of our invention will be apparent to those skilled in the art from the following discussion and drawings in which:

FIGURE 1 is a diagram showing the sequence of operations in the film forming and orientation process;

FIGURE 2 is a drawing in elevation and partly in section of the tube extruder die head, sizing and cooling sleeve and cooling bath, including a diagrammatic representation of the apparatus used to supply pressurized gas for the sizing and expansion operations;

FIGURE 3 is a drawing in elevation and partly in section of the tube pulling means and the reheating bath;

FIGURE 4 is an end view of the tube pulling means;

FIGURE 5 is an elevational drawing partly in section of the apparatus used for draft cooling the expanded tube, chilling the expanded tube, collapsing the expanded tube and winding up the collapsed film; and FIGURE 6 is an illustration of the expanding bubble showing the position of annular baffles which can be used to control the flow of cooling air over the outer surface of expanding tube.

While this invention can be used advantageously in the fabrication of any crystallizable thermoplastic polymer such as polyvinylidine chloride, nylon, polyethylene glycol terephthalate or the like, it is of particular advantage in the biaxial orientation of the highly crystalline olefin polymers, such as polyethylene, polypropylene, poly-1-butene, poly-4-methylpentene-1 and other homopolymers and copolymers of similar mono-1-olefins containing up to 8 carbon atoms per molecule. We prefer to practice the invention with the more crystalline olefin polymers, for example, those having a degree of crystallinity of at least 70 and more preferably at least 80 percent at 25° C. Examples of such polymers are crystalline polypropylene and polybutenes and the high density ethylene polymers, particularly the homopolymers of ethylene and copolymers of ethylene with higher mono-1-olefins, these polymers having a density of about 0.940 to 0.990 gram per cubic centimeter at 25° C. As used herein the term "density" refers to the weight/unit volume (grams/cubic centimeter) of the polymer at 25° C. The density of polymer should be determined while the sample of the polymer is at thermal and phase equilibrium. In order to insure this equilibrium it is desirable to heat the sample to a temperature 15 to 25 centigrade degrees above its melting point and allow the sample to cool at a rate of about 2 centigrade degrees/minute to the temperature at which the density is to be measured. Any standard method for determining the density of a solid can be used. The crystallinity of the olefin polymers can be determined by X-ray diffraction or nuclear magnetic resonance. Prior to the determination of crystallinity it is desirable that the sample of the polymer be treated for thermal equilibration in a manner described in connection with the density determination.

The higher crystalline olefin polymers referred to above do not have a single freezing and melting point but instead have a crystalline freezing point at which maximum crystalline formation occurs upon cooling of the molten polymer and a separate crystalline melting point at which evidence of crystallinity disappears upon heating a sample of the polymer from a cooled crystalline condition. Ordinarily the latter temperature is several degrees above the crystalline freezing point. The crystalline freezing point of these polymers can be determined by melting a sample of the polymer, inserting a thermocouple in the molten polymer and allowing the polymer to cool slowly. The temperature is recorded and plotted on a chart versus time. The crystalline freezing point is the first plateau in the time-versus-temperature curve. For polyethylene having a density of about 0.960 the crystalline freezing point is about 252° F. The crystalline melting point of these polymers can be determined by melting a small piece of plastic (usually film) under crossed polaroids in a microscope equipped with means for heating the polymer. The specimen is heated slowly and the melting point is the temperature at which birefringence disappears. For polyethylene having a density of about 0.960 the crystalline melting point is ordinarily about 272° F.

The optimum temperature for orientation is the highest temperature which can be achieved while the resin mass is still in a substantially crystalline condition. This temperature will vary depending upon the polymer used and its crystalline melting point. For ease of control it is desirable that this temperature be approached from below by heating a film of the polymer which is in a substantially uniform crystalline state. Nonuniformity in the crystalline condition of the polymer makes it difficult to stretch the tube so that a film of uniform gauge is obtained. In the continuous production of the film, therefore, we desire to form the tube, cool it to a crystalline state and then reheat it to the orientation temperature. This sequence of operations is illustrated in FIGURE 1.

A tube of the desired diameter and wall thickness is formed in extrusion step 10 from the polymer melt. Extrusion temperatures will vary considerably depending upon the polymer used. For example, for polymers such as high density polyethylene or polypropylene extrusion temperatures of about 350 to 400° F. are frequently employed. The tube having a predetermined diameter and wall thickness issues from the extruder die and passes immediately into a sizing sleeve where it is cooled by indirect heat exchange with a cooling liquid and at the same time stretched slightly to produce the desired wall thickness. In sizing operation 11 at least the surface of the tube is cooled to a substantially crystalline condition, generally at least several degrees below the crystalline freezing point of the polymer. With the high density ethylene polymers, at least the surface of the tube is cooled to below about 250° F. Since it is necessary to insure that all of the polymer in the tube is in substantially uniform crystalline condition, the tube is then passed to a cooling step 12 where it is placed in direct heat exchange with a cooling liquid for a sufficient period of time to cool all of the polymer in the tube below the crystalline freezing point. Ordinarily the tube is further cooled in this operation to temperatures of about 210° F. or below. The cooled tube then passes to conveying operation 13 which employs a positive-grip conveying means which pulls the tube through the sizing and cooling steps at a rate slightly faster than the extrusion rate. In this way the wall thickness of the tube can be controlled within relatively narrow limits.

Conveying operation 13 not only pulls the tube through sizing and cooling steps 11 and 12 but also pushes the tube into reheating step 14. The reheating step brings the tube to the proper orientation temperature, which, as pointed out previously, is within a few degrees below the crystalline melting point of the polymer. As the tube issues from reheating step 14 it is subjected to step 16 which includes simultaneous expansion and drawing in combination with the draft cooling. In operation 16 the tube of polymer is simultaneously stretched in the machine in transverse directions while at the same time it is subjected to a cooling gradient so that the temperature of the tube when it reaches its final diameter is several degrees below the temperature of the tube as it issues from reheating step 14. This cooling gradient has been found essential in the production of films of crystalline olefin polymers having a predetermined balance of properties, for example, equal elongation properties in both the machine and transverse directions. After the tube has been expanded to its desired diameter it is immediately chilled in step 17 to reduce the temperature of the polymer to substantially below its orientation temperature so that no further stretching takes place in either the machine or transverse directions. The expanded and chilled tube is then collapsed in step 18 to form a two layer film which can then be wound up on a reel in step 19.

Having thus described the overall operation in a general fashion attention is now given to the individual features, referring first to FIGURE 2. FIGURE 2 is an elevational view of the extrusion, sizing and cooling stages of the operation. Molten polymer is fed in the conventional manner by extruder 20 to crosshead die 21. Crosshead die 21 is equipped with a mandrel 22 and die 23 which together define an annular orifice through which the molten polymer is extruded in the form of a tube. The diameter and thickness of the tube thus extruded depends upon the desired size and thickness of the expanded and oriented tube and the degree of drawdown and expansion required to produce the desired physical properties.

As the tube issues from the die it passes immediately into cooling and sizing sleeve 24 which with jacket 26 is attached through collar 27 to die head 21. Jacket 26 defines annular chambers 28 and 29 through which cooling liquid can be circulated in indirect heat exchange relationship with the tube passing through sleeve 24. In order to facilitate the operation on start-up and to insure that the tube makes close contact with the walls of sleeve 24, a plurality of vacuum ports 30 are provided with numerous holes connecting the ports to the space between tube wall and the cooling sleeve. Since there is usually a slight tendency of the tube to shrink as it is cooled, flange 31 with seal ring 32 is provided to seal the space between the tube wall and the cooling sleeve thereby preventing loss of the vacuum. A plurality of O-rings 33 are provided between the jacket and the cooling sleeve in order to seal the annular spaces used for vacuum and cooling liquid.

By the time tube 34 leaves the cooling sleeve it has been sufficiently cooled on the surface that it can be further cooled by a direct heat exchange with a cooling liquid. Tube 34 then passes directly into water bath 36 through which water is circulated via inlet 37 and outlet 38. Flexible seals 39 and 40 at the entrance and exit, respectively, of water bath 36 prevent the water from being lost from the tank. Thus, the tube 34 is formed having the desired dimensions and with the polymer therein in uniform crystalline condition. In the manufacture of film for heavy bag material the tube will ordinarily have a diameter of about 2 to 6 inches and a thickness in the range of about 30 to 70 mils.

Once the operation has been started and is on a continuous basis the gauge uniformity of the tube can be improved by employing relatively high internal pressures within the tube while it is in the cooling and sizing sleeve. Since relatively low pressures are necessary for the expansion of the tube during the orientation process, we have provided the apparatus shown in FIGURE 2 so that two distinct pressure zones can be maintained within the tube; an upstream high pressure zone for expanding the tube slightly against the walls of the sizing sleeve, and a downstream low pressure zone used for the orientation process. These two zones are maintained by seal 41 which is positioned within the tube downstream from the sizing sleeve but upstream from the reheating operation. Conduit 42 passes axially through crosshead die 21 and is connected to line 43. Line 43 contains pressure gauge 44 and pressure regulator 46 and is connected to a source of high pressure air through conduit 47 and filter 48. Ordinarily a pressure in the range of about 10 to 30 lbs. per square inch gauge will be satisfactory for the purpose of expanding the tube against the walls of the sizing sleeve.

Conduit 42 is in open communication with the upstream zone 49 within the tube between mandrel 22 and seal 41. Seal 41 prevents the high pressure within zone 49 from being transmitted to the volume within the tube downstream from seal 41. Conduit 50 passes through seal 41 and axially through conduit 42. Conduit 50 communicates with the zone within the tube downstream from seal 41 and is connected through line 51 containing pressure gauge 52 to three-way valve 53. During normal operation line 51 is connected through valve 53 to line 54 carrying pressure regulators 56 and 57 and pressure gauge 58. Conduit 54 is also connected through line 47 to the high pressure air source but the pressure within line 54 at the three-way valve 53 is reduced to about 1 to 3 lbs. per square inch gauge by regulators 56 and 57. Thus the pressure within zone 49 can be maintained at about 10 to 30 lbs. per square inch for the purpose of sizing the tube in cooling sleeve 24 while the pressure for the orientation operation is maintained much lower, for example about 1 to 3 lbs. per square inch gauge. Where higher pressures are needed for initially expanding the tube in starting up the orientation process, three-way valve 53 is provided so that line 51 can be manually connected to the high pressure air source through line 59.

Referring now to FIGURE 3, a contoured jaw tube puller 60 is shown for the purpose of pulling the tube from the cooling sleeve and through the water bath and pushing the tube into the reheating bath 61. The speed of tube puller 60 is regulated so that the tube is pulled from the sizing sleeve slightly faster than the rate at which the tube is extruded from the die. The slight tension which is placed on the tube within the sizing sleeve causes a small reduction in tube thickness immediately after the tube is extruded and before it is cooled and thereby improves the gauge uniformity of the tube. Tube puller 60 is provided with a plurality of contoured jaws 62 mounted in upper and lower chain sets 63 and 64, respectively. Chain set 63 is driven by sprocket wheels 66 which in turn are powered by a variable speed motor not shown. Chain set 63 also turns on idler sprocket wheels 67. Chain set 64 is driven by sprocket wheels 68 which are geared to sprocket wheels 66. Chain set 64 also turns over idler sprocket wheels 69. As chain sets 63 and 64 are rotated the contour jaws 62 close about the tube 34 gripping it firmly but without deformation and advance it from the water bath into the reheating bath 61. An end view of the contour jaw tube puller is shown in FIGURE 4. In order to prevent slipping and deformation of the tube resilient pads 70 are provided in each of the contour jaws.

Referring again to FIGURE 3 tube 34 which is in a relatively cool uniform crystalline condition is passed by the tube puller 60 into heating bath 61. Heating bath 61 comprises an elongated cylindrical shell 71. Shell 71 is fastened at one end by flange 72 having a resilient ring portion 73 to head member 74. Head member 74 is equipped with a heating liquid inlet 76 and a liquid seal 77 made of rubber or Teflon. This seal prevents the heating liquid, which is preferably ethylene glycol, from leaking at the point at which the tube 34 enters the heating bath. In a similar manner the shell 71 is attached at its other end by flange 78 to head member 79 which is equipped with the glycol outlet 80 and liquid seal 81. A seal ring of polytetrafluoroethylene is preferred for this service. The inside diameter of shell 71 is larger than the outside diameter of tube 34 and the tube is supported within the shell by helical rod 82. Rod 82 can be formed from metal and coated with polytetrafluoroethylene in order to reduce friction between the rod and the outside of the tube. The outside diameter of the helix corresponds approximately to the internal diameter of shell 71 and the internal diameter of the helix is approximately equal to the external diameter of tube 34. There is defined, therefore, by helical rod 82 and shell 71 cooperating with tube 34 a helical path passing from the inlet end of shell 71 to the outlet thereof encircling the tube 34 thereby insuring more uniform heating of the tube. The tendency of the heating fluid to stratify according to temperature is lessened and the temperature of the tube issuing from the heating bath is much more uniform.

Another very important advantage accrues from the use of the helical shaped guide rod. This rod tends to act like a spring and compress slightly on occasions when the tube starts to buckle within the bath. This slight compression of the guide rod prevents what would otherwise become a serious block-up in the heating bath requiring complete shut-down of the operation. The situation frequently corrects itself or corrective action can be taken during the delay provided by the compression of the guide rod. During normal operation, the slight spring action of the helix serves to maintain the friction drag on the tube at a low constant value by a self regulating action. If friction were to increase slightly, the increased drag of the tube on the helix would give it a minute compression which minutely increases the inside diameter of the helix which in turn at once lowers the drag and the helix loses its compression and the normal condition is restored.

We have found that improved uniformity of heating of the tube can be affected through the use of a helical wiper 83 attached to rod 82. Only a portion of wiper 83 is shown in FIGURE 3. This wiper is formed from resilient material such as rubber which is resistant to the hot heating fluid. Wiper 83 improves the seal between rod 82 and tube 34 thereby forcing better circulation of the heating fluid in the above described helical path. Also wiper 83 repeatedly wipes the liquid film from the outer surface of tube 34, thereby bringing about more efficient heat exchange between the tube and the heating fluid.

Because of the tendency of the tube to buckle, as described above, it is highly desirable to construct shell 71 from a transparent material such as Pyrex glass. By so doing the condition of the tube within the heating bath is clearly visible to an operator. There is frequently a tendency for the tube to block up within the heating bath, thereby necessitating the shut-down of the operation and repeating the involved start-up procedure. We discovered that these block-ups were caused by the tube buckling within the bath as a result of an imbalance between the rate at which the tube is forced into the bath and the rate at which it is withdrawn. By constructing the shell of a transparent material this tendency to buckle can be detected visually at a very early stage and the take-off rate can be increased slightly to avoid the problem.

The residence time of the tube within the heating bath must be sufficiently long that all of the polymer in the tube is brought to orientation temperature. This does not mean that the temperature of the tube need be uniform throughout but there should not be more than a few degrees, for example, 1 to 5° F., difference between the inside and the outside of the tube. Depending upon the operation, the length of heating bath 61 can be increased or, as is frequently desirable, a plurality of such heating baths can be used so that the temperature gradient of the heating liquid between its inlet and outlet is minimized. From a practical standpoint, the length of the heating bath is limited by the friction between the tube and the guide rod. Necking of the tube within the bath must be avoided since otherwise the seal between seal ring 81 and the tube cannot be maintained and the heating fluid will leak from the bath.

The heating liquid can pass in either concurrent or countercurrent flow to the travel of the tube but concurrent flow is preferred. If the temperature in the bath is too high there is a tendency of the tube to stick to the helical rod or to the seal 81. If the temperature of the bath is too low there is too little heat transfer between the bath and the tube. Ordinarily, the operation can be carried out so that the external surface temperature of the tube as it issues from the bath is substantially the same as the temperature of the heating liquid in the bath and the internal temperature of the tube is within about 1 to 5° F. below the outside surface temperature. The heating liquid is wiped from the surface of the tube by seal 81 and the tube is then in the proper condition for biaxial orientation.

Referring now to FIGURE 5, tube 34 as it issues from the heating bath 61 is expanded by internal fluid pressure while at the same time it is stretched in a linear direction. The trapped bubble method of operation is not adequate here but the inflating gas must be in continuous supply and adequately pressured as described in connection with FIGURE 2. The ratio of the final to the initial diameter of the tube depends upon the properties desired in the finished product. When working with tubes of highly crystalline olefin polymers, a clear, strong film can be produced using relatively high blow-up ratios, for example, from about 7 to 1 to 10 to 1. We have found, however, that the tough films which are most suitable for the production of bag material are made using much lower blow-up ratios, for example about 3 to 1 to 6 to 1 and preferably a blow-up ratio of about 4 times is employed. For balanced properties the amount of stretch in both the machine and transverse directions should be approximately equal. Some improvement in gauge uniformly can be obtained, however, if the machine direction stretch ratio is slightly higher than the transverse direction blow-up ratio.

The temperature at which the orientation is carried out is dependent upon the polymer employed. Using an ethylene polymer having a density of about 0.960 gram per cubic centimeter at 25° C., the orientation should be carried out at a temperature in the range of 260 to 270° F., preferably in about the middle of this range. Better gauge uniformity can thereby be obtained than when operating at somewhat lower temperatures. These temperatures refer to the temperature of the polymer immediately after it issues from the heating bath when stretching begins. We have found that once stretching has started it will proceed satisfactorily at progressively lower temperatures. The best balance of properties can be obtained, therefore, by directing a cooling gas on the outside of the expanding tube so that the temperature of the tube decreases while it is undergoing the biaxial orientation. As shown in FIGURE 5, this cooling air is supplied tangentially at inlet 84 to open ring member 86 which is positioned immediately downstream from the heating bath 61 so that the tube must pass through ring 86 as it expands. In the absence of cooling gas supplied by ring member 86 there is a tendency of the temperature of the film undergoing biaxial orientation to rise because of the work being performed on it. Because the tube as it issues from the heating bath is immediately at orientation temperature there would apparently be no need to condition the tube further temperaturewise. The stretching takes place immediately after the tube issues from the heating bath so that this portion of the operation is carried out in a relatively short distance, for example, about 2 to 10 inches, depending upon the diameter to which the tube is inflated. Even though the ambient atmosphere it at a temperature far below that of the tube as it issues from the bath, we have found that no significant cooling of the tube occurs in the absence of a direct effort to circulate cooling gas about the tube. The stagnant air film effectively insulates the expanding tube and, in any event, the heat loss to the surrounding atmosphere does little more offset the heat generated within the tube as a result of the mechanical work performed on it. The production of a decrease in temperature along the tube as it expands was found to be essential to obtain the satisfactory balance of properties which is desired in bag materials.

After the tube has expanded to the desired diameter it passes into a final sleeve 87 where it is chilled by cooling liquid circulating through coils 88. Sleeve 87 is preferably aluminum with a chrome plate polished to a satin finish. The expanded tube is cooled sufficiently in sleeve 87 that further stretching is prevented in either direction. In place of cooling sleeve 87, jets of cooling gas may be used to chill the tube to temperatures far below that necessary for orientation and thereby prevent further radial or longitudinal stretching. This final cooling step must not be confused with the cooling air impinged upon the expanding bubble by air ring 86. The cooling gas distributed by ring 86 produces a cooling gradient across the expanding tube but maintain the tube at orientation temperature. The cooling which is carried by sleeve 87 or equivalent means cools the tube after orientation has been completed and serves to set the orientation and prevent further expansion. Thus, the cooling functions illustrated in FIGURE 5 are independent and each serves a different purpose.

Expanded and oriented film which is to be used for bags will ordinarily have a thickness of about 1 to 5 mils and the diameter of the tube may vary from about 8 to 24 inches. Of course, other combinations of dimensions are possible and depend upon the use to which the film is put. The expanded and oriented film passes from chilling sleeve 87 to collapsing stand 89 which comprises upper and lower roller bearings 90 and 91, respectively, which converge towards pinch rolls 92. Pinch rolls 92 seal the expanding air within the tube and are power driven in order to place the necessary tension on the tube required for the longitudinal stretching and orientation. The speed of pinch rolls 92 is adjusted so that the take off rate of the film is faster than the rate at which the tube issues from the heating bath 61. The ratio of these two speeds determines the machine direction stretch ratio. The collapsed tube then passes over idler rolls 93 and 94 and between a second set of pinch rolls 94 before it is taken up on reel 97.

Another embodiment of this invention relative to the control of the temperature of the expanding bubble is illustrated in FIGURE 6. This drawing illustrates how the configuration of the expanding bubble can be controlled and the areas which are contacted by the cooling gas varied by using a plurality of annular baffles 98, 99, 100 and 101. These baffles, mounted on rods not shown, are supported from cooling sleeve 87 so that the baffles can be moved back out of contact with the expanding bubble against heating bath 61, or positioned at various locations to effect the impingement of the cooling air on certain areas of the tube as it expands. Baffle 99 is shown equipped with a ring member 102, having a tangential air inlet 103. This baffle can then serve the purpose similar to that of ring 86 in FIGURE 5 and by moving the baffle to various positions in relation to the other baffles the effect of the cooling gas can be localized on various parts of the expanding bubble. The positioning of the baffles can be determined by distances a, b, c and d. This distance over which the bubble undergoes expansion is designated by the distance x and it is over this distance that the temperature gradient is produced according to our invention. This can also be defined as the distance between the position where the tube begins inflation from diameter y and the position where it stops inflating at diameter z. In the biaxial orientation of high density ethylene polymers the temperature gradient should be at least 6° F. The cooling gradient should not exceed about 20° F. If the stock is cooled too severely the surface becomes too cold for proper stretching and a rough appearing film results.

The use of the cooling gas on the expanding bubble according to our invention enables greater flexibility between the relative ratios of machine direction and transverse direction stretching. The machine direction stretching cannot be increased merely by speeding up the take-up rate without compensation in other variables of the process as such action would merely cause the tube to neck in the glycol bath causing the glycol to leak around the tube as it leaves the bath or causing the tube to split rather than expand uniformly. The use of the annular baffles as illustrated in FIGURE 6 provides a retarding force at the point of blowing since the tube tends to billow somewhat between the baffles. This relieves the extra tension from the tube in the bath and thereby limits the tension on the tube immediately downstream from the bath. As shown in FIGURE 6, the tube is forced to assume a substantially conical shape as it expands. Higher machine direction stretching is thereby possible through the use of the annular baffles. Also by regulating the cooling bubble as it expands, balanced film properties can be obtained with less restriction on the operating rates. The cooling gas tends to shift the machine direction stretch to the hotter upstream portion of the bubble where the stretching produces less orientation. This also causes the transverse stretching to take place at lower temperatures where the stretching is more effective for orientation. As has been pointed out these lower temperatures can be achieved once the stretching is initiated without sacrifice of gauge uniformity. In order to minimize streaking of the film the cooling air should be kept away from the smaller portion of the bubble as it issues from the heating bath. The annular baffles can be used for this purpose to direct and confine the cooling air to certain areas of the expanding tube. Thus by proceeding according to the invention, film can be produced having moderately high tensile strengths plus high elongation, particularly in the machine direction. This produces a tough film which is useful as a bag material and can withstand impact which is more important than high absolute values of tensile strength. The property of machine direction elongation is especially important in applications where the bags are to be heat sealed as this elongation enables stress concentrations at the seal to be dissipated.

In order to illustrate further the advantages of our invention, the following example is presented. The conditions given in this example should be interpreted as typical only and not construed to limit our invention unduly.

Polyethylene having a density of 0.960 gram per cubic centimeter and a melt index of 0.2 (ASTM–D–1238–52T) was extruded at a temperature of 350° F. through a 1½ inch diameter die opening with an extruder screw speed of 22 r.p.m. The throughput of the extruder was 11 lbs. per hour. The tube thus formed was passed through a sizing sleeve, cooled in a water bath and then passed into a glycol heating bath in which the glycol flow was countercurrent to the polymer tube. The inlet temperature of the glycol was 266° F. and the outlet temperature was 260° F. Polymer was thus heated to approximately the inlet temperature of the glycol and then stretched biaxially by inflation and simultaneous tension to give a machine direction stretch ratio of 6.2 and a transverse direction stretch ratio of 4.3. The transverse direction stretch ratio is the ratio of the final tube diameter to the diameter of the extruded tube. The machine direction stretch ratio is the ratio between the film windup speed and the speed of the tube puller upstream from the glycol bath. The final film thickness was approximately 1.2 mils. Annular baffles were used as shown in FIGURE 6 and the spacings were changed as indicated in Table I with reference to the spaces lettered in FIGURE 6. The runs were carried out under otherwise identical conditions except for the presence or absence of cooling air as indicated in Table I. Cooling air, when employed was distributed around the expanding bubble as shown in FIGURE 6 using an inlet air pressure of 20# per sq. inch gauge. The temperature of the cooling air was about 70° F. The cooling gradient was thus produced across the expanding bubble in those runs where cooling air was employed.

TABLE I

| Baffle Spacing (inch) | | | | Cooling Air | Tensile Strength (p.s.i.) | | Elongation, percent | |
| --- | --- | --- | --- | --- | --- | --- | --- | --- |
| a | b | c | d | | MD | TD | MD | TD |
| ¼ | ¼ | 9/16 | ¼ | None | 22,700 | 15,200 | 60 | 110 |
| ¼ | ¼ | 9/16 | ¼ | Yes | 16,400 | 16,100 | 90 | 80 |
| ½ | ½ | 9/16 | ½ | None | 24,000 | 16,400 | 40 | 90 |
| ½ | ½ | 9/16 | ½ | Yes | 15,200 | 14,200 | 60 | 100 |
| ½ | ⅝ | 9/16 | ⅝ | None | 23,700 | 11,600 | 40 | 140 |
| ½ | ⅞ | 9/16 | ⅝ | Yes | 15,400 | 12,600 | 70 | 100 |

The data of Table I show that the use of cooling air permitted more balanced tensile properties in both machine and transverse directions and also better balanced elongation. The substantially increased elongation in the machine direction is desirable for the formation of bags to be heat sealed.

As will be apparent to those skilled in the art from the above disclosure, various modifications can be made in our invention without departing from the spirit or scope thereof.

We claim:

1. Apparatus for producing a biaxially oriented film of crystalline thermoplastic polymer comprising, in combination, extrusion means including a tubing die, a sizing and cooling sleeve attached to said die, a cooling bath positioned to receive the extruded tube from said sleeve, means for pulling said tube through said sleeve and cooling bath, a heating bath positioned downstream from said pulling means, means for circulating a heated liquid through said heating bath in order to bring the tube to orientation temperature, means for introducing pressurized gas inside the tube in order to inflate same as it issues from said heating bath, means for collapsing and pulling the inflated tube in order to stretch the tube lengthwise as it issues from said heating bath, means for chilling the inflated and stretched tube in order to set the orientation prior to collapsing the tube and means comprising a plurality of annular baffles of graduated inside diameters positioned between said heating bath and said chilling means in spaced relationship to define a substantially conical path for the tube as it is inflated (for directing a current of cooling gas onto the outer surface of the tube as it is inflated and stretched).

2. Apparatus of claim 1 wherein a tube sealing means is disposed between said sleeve and said heating means thereby forming distinct upstream and downstream zones within the tube passed around same and wherein a first conduit extends through said die head and connects a source of high pressure gas to said upstream zone and second conduit extends through said die head, upstream zone and tube sealing means and connects a source of low pressure gas to said downstream zone.

3. Apparatus for producing a biaxially oriented film of crystalline thermoplastic polymer comprising, in combination, extrusion means including a tubing die, a sizing and cooling sleeve attached to said die, a cooling bath positioned to receive the extruded tube from said sleeve, means for pulling said tube through said sleeve and cooling bath, a heating bath positioned downstream from said pulling means, means for circulating a heated liquid through said heating bath in order to bring the tube to orientation temperature, means for introducing pressurized gas inside the tube in order to inflate same as it issues from said heating bath, means for collapsing and pulling the inflated tube in order to stretch the tube lengthwise as it issues from said heating bath, means for chilling the inflated and stretched tube in order to set the orientation prior to collapsing the tube and means comprising an annular chamber through which the tube passes between said heating bath and said chilling means and means for distributing a stream of cooling gas inside said annular chamber around said tube for directing a current of cooling gas onto the outer surface of said tube as it is inflated and stretched.

4. The apparatus of claim 3 wherein a tube sealing means is disposed between said sleeve and said heating means thereby forming distinct upstream and downstream zones within the tube passed around same and wherein a first conduit extends through said die head and connects a source of high pressure gas to said upstream zone and second conduit extends through said die head, upstream zone and tube sealing means and connects a source of low pressure gas to said downstream zone.

5. Apparatus for heating a tube of thermoplastic polymer for biaxial orientation comprising an elongated cylindrical shell through which said tube can be passed, a helical rod disposed longitudinally within said shell, the outside diameter of the helix approximately equalling the inside diameter of said shell and the inside diameter of said helix equalling substantially the outside diameter of the tube so that said rod and shell cooperate with the tube to define a helical channel passing through said shell between the shell and the tube, means for introducing a heating liquid into one end of said channel, means for removing said liquid from the outer end of said channel, and sealing means at each end of said shell to prevent said liquid from escaping at the entry and exit of said tube.

6. The apparatus of claim 5 wherein said shell is transparent permitting view of said tube within said shell.

7. The apparatus of claim 5 comprising a resilient wiper attached along said rod to make helical contact with said tube.

8. The apparatus of claim 7 wherein said helical rod is flexible and has freedom of longitudinal movement in compressive action within said shell and said outside diameter of the helix is slightly smaller than said inside diameter of said shell so that said helix is capable of a small axial compression due to the frictional drag of said tube with a resulting slight increase in said inside diameter of said helix.

References Cited by the Examiner

UNITED STATES PATENTS

| 2,947,031 | 8/1960 | Ho Chow et al. | 18—14 X |
| 2,947,032 | 8/1960 | Taylor | 18—14 |
| 2,955,321 | 11/1960 | Former et al. | 18—14 X |
| 2,963,742 | 12/1960 | Ahlich et al. | 18—14 |
| 3,068,516 | 12/1962 | Hofer | 18—14 X |
| 3,217,359 | 11/1965 | Euling | 18—14 |

FOREIGN PATENTS 1,238,367  7/1960  France.

WILLIAM J. STEPHENSON, *Primary Examiner.*